US006973862B2

(12) United States Patent
Bucks

(10) Patent No.: US 6,973,862 B2

(45) Date of Patent: Dec. 13, 2005

(54) METHOD AND APPARATUS FOR DELIVERING PRODUCT TO A CUTTING DEVICE

(75) Inventor: Brent L. Bucks, Porter County, IN (US)

(73) Assignee: Urschel Laboratories, Inc., Valparaiso, IN (US)

( * ) Notice: Subject to any disclaimer, the term of this patent is extended or adjusted under 35 U.S.C. 154(b) by 46 days.

(21) Appl. No.: 10/072,494

(22) Filed: Feb. 4, 2002

(65) Prior Publication Data

US 2003/0145698 A1 Aug. 7, 2003

(51) Int. Cl.[7] .......................... B23D 19/00; B26D 7/06; B26D 5/00

(52) U.S. Cl. ................................ 83/13; 83/98; 83/177; 83/402; 83/418; 83/444; 83/703; 83/932

(58) Field of Search ........................... 83/22, 168, 169, 83/402, 403, 418, 452, 932, 663, 446, 447, 109, 98; 99/594, 595

(56) References Cited

U.S. PATENT DOCUMENTS 2,664,130 A * 12/1953 Kubon ........................ 83/395
2,961,024 A * 11/1960 Urschel et al. ............... 83/403
4,095,751 A 6/1978 Artin
4,227,656 A 10/1980 Engelbretsen
4,367,667 A * 1/1983 Shibata ...................... 83/356.3
4,546,684 A 10/1985 Bellerose
4,614,141 A * 9/1986 Mendenhall et al. ......... 83/402
4,644,838 A * 2/1987 Samson et al. ............... 83/865
4,683,790 A * 8/1987 Bittner ...................... 83/356.3
5,343,791 A 9/1994 Julian et al.
5,473,967 A * 12/1995 Frey et al. .................... 83/402
5,992,284 A 11/1999 Bucks
6,148,702 A 11/2000 Bucks
6,148,709 A 11/2000 Bucks

FOREIGN PATENT DOCUMENTS

| | | | |
|---|---|---|---|
| CA | 2309594 | 5/1999 | |
| DE | 3546506 | 3/1987 | |
| DE | 3934143 | 4/1991 | |
| DE | 10057835 | 8/2002 | |
| JP | 63222038 A * | 9/1988 | .......... C03B/37/16 |
| NL | 1006794 | 2/1999 | |

* cited by examiner

*Primary Examiner*—Allan N. Shoap
*Assistant Examiner*—Isaac N Hamilton
(74) *Attorney, Agent, or Firm*—Hartman & Hartman; Gary M. Hartman; Domenica N. S. Hartman

(57) ABSTRACT

A method and apparatus by which potatoes and other elongate food product can be properly oriented and stabilized during a slicing operation performed by a cutting device having a horizontal cutting plane. The apparatus includes a passage extending downwardly toward the cutting device and defining an opening in proximity to the cutting device, splines or other suitable features disposed along a first portion of the passage and oriented substantially parallel to the passage, and means for applying a force on a food product traveling downward through the passage so as to urge the product into contact with the splines during engagement with the cutting device.

36 Claims, 3 Drawing Sheets

METHOD AND APPARATUS FOR DELIVERING PRODUCT TO A CUTTING DEVICE

CROSS REFERENCE TO RELATED APPLICATIONS

Not applicable.

STATEMENT REGARDING FEDERALLY SPONSORED RESEARCH

Not applicable.

BACKGROUND OF THE INVENTION (1) Field of the Invention

The present invention generally relates to cutting methods and equipment. More particularly, this invention relates to a method and apparatus for delivering food product to a cutting device having a horizontal cutting plane, by which the product is properly oriented and stabilized to produce a sliced product of uniform thickness.

(2) Description of the Related Art

Various types of equipment are known for slicing, shredding and granulating food products such as vegetables, fruits and meat products. A particular example is slicing equipment adapted for cutting root vegetables, such as potatoes, into thin slices suitable for making potato chips (also known as potato crisps). A widely used machine for this purpose is commercially available from the assignee of the present invention under the name Urschel Model CC. The Model CC is a centrifugal-type slicer capable of producing uniform slices, strip cuts, shreds and granulations of a wide variety of food products at high production capabilities. The centrifugal operation of the Model CC does not provide for orienting an elongate product so that its longitudinal axis is perpendicular to the cutting blades. Therefore, when used to produce potato slices for potato chips, the Model CC requires the use of substantially round potatoes in order to produce the desired circular chip shape with a minimum amount of scrap.

Because potatoes tend to have an elongated shape, round potatoes of the type that can be processed with the Model CC typically cost more, generally as a result of the special potato varietals and/or farming techniques required to produce a rounder shape. In view of this additional cost, it would be desirable if potato chips with the desired circular shape could also be produced from potato varietals with elongate shapes. It is also of ongoing interest in the industry to achieve greater chip consistency in terms of shape and thickness, while minimizing scrap.

The TranSlicer 2000® is a slicing apparatus that has found wide use for slicing elongate food products. Commercially available from the assignee of the present invention and disclosed in U.S. Pat. No. 6,148,702 to Bucks, the TranSlicer 2000® employs a cutting wheel disposed in a vertical plane and rotated on a horizontal axis, with radial cutting blades mounted between a hub and an annular-shaped rim. A notable example of a cutting wheel suitable for use with the TranSlicer 2000® is disclosed in commonly-assigned U.S. Pat. Nos. 5,992,284 and 6,148,709 to Bucks. A conveyor or other suitable device is required to deliver product horizontally to the cutting wheel. The cutting operation performed by the TranSlicer 2000® is generally limited to the hemisphere of the cutting wheel in which the blades are traveling downward, because attempting to cut a product as the blade travels upward tends to lift the product off the conveyor.

The TranSlicer 2000® is well suited for slicing, shredding and granulating a wide variety of fruits, vegetables and meat products, including the slicing of elongate potatoes for potato chip production. However, a difficulty arises when attempting to produce crinkled slices (slices having a corrugated shape when viewed edgewise) or "V-slices" (similar to crinkled but with relative sharp peaks and valleys when viewed edgewise), both of which are common shapes for potato chips. As noted above, the TranSlicer 2000® is generally limited to a cutting operation performed in the hemisphere of the cutting wheel in which the blades are traveling downward. Even when being sliced in a downward direction, an elongate product can rotate slightly about its longitudinal axis for lack of a means for positively holding the product while engaged with the blade. While this aspect is of no significance when slicing most elongate products to produce flat slices, any rotation of an elongate potato that occurs when attempting to produce crinkled or V-slice chips results in the grooved pattens on opposite surfaces of a chip being misaligned, which can be aesthetically undesirable, cause uneven cooking, and produce shredded product if the chips are sliced sufficiently thin, e.g., on the order of about two mm or less.

In view of the above, it would be desirable if an improved method and apparatus were available that enabled potatoes and other elongate products to be properly oriented and stabilized during a slicing operation. Such a method and apparatus would preferably be suitable for producing crinkled and V-slice potato chips while preferably achieving high production capabilities and minimizing scrap.

BRIEF SUMMARY OF THE INVENTION

The present invention provides a method and apparatus by which potatoes and other elongate food products can be properly oriented and stabilized during a slicing operation, while also enabling high production capabilities and minimizing scrap. The method and apparatus of this invention particularly provide for delivering food product to a cutting device having a horizontal cutting plane, which can therefore make use of gravity to deliver the product to the cutting device, but requires that the product is properly oriented and stabilized after traveling in a downward direction to the cutting device.

The apparatus of this invention includes a passage extending downwardly toward the cutting device and defining an opening in proximity to the cutting device, splines or other suitable guide means disposed along a first portion of the passage and oriented substantially parallel to the passage, and means for applying a force on a food product traveling downward through the passage so as to urge the product into contact with the splines during engagement with the cutting device. Accordingly, the method of this invention entails the delivery of food product to the cutting device through the passage, and applying a sufficient force on the product as it travels downward through the passage so that the orientation of the product remains substantially constant within the passage by the splines during engagement with the cutting device.

According to a first preferred aspect of the invention, the force is applied to the product by at least two fluid jets flowing across the passage toward the first portion, such that the fluid jets impact the product as the product travels downward through the passage. According to another preferred aspect of the invention, elongate products are delivered to the passage by means capable of separating and longitudinally aligning the products with the passage, so that the elongate products enter the passage with their longitudinal axes roughly parallel to the passage.

In view of the above, it can be seen that a significant advantage of this invention is that potatoes and other elongate food products can be properly oriented and stabilized during a slicing operation by delivering the product in a downward direction to a substantially horizontal cutting device. Orientation and stabilization of elongate product are achieved by applying a sufficient lateral force on the product to maintain the product in contact with splines or other features capable of maintaining the orientation of the product within the passage. Another significant advantage of this invention is that the use of a substantially horizontal cutting device allows the entire cutting plane to be used in performing the cutting operation, since the cutting action does not have any tendency to lift or otherwise disorient the product during the cutting operation. As such, the method and apparatus of this invention can be used to achieve high production capabilities while minimizing scrap.

Other objects and advantages of this invention will be better appreciated from the following detailed description.

DETAILED DESCRIPTION OF THE INVENTION

Figure 1:
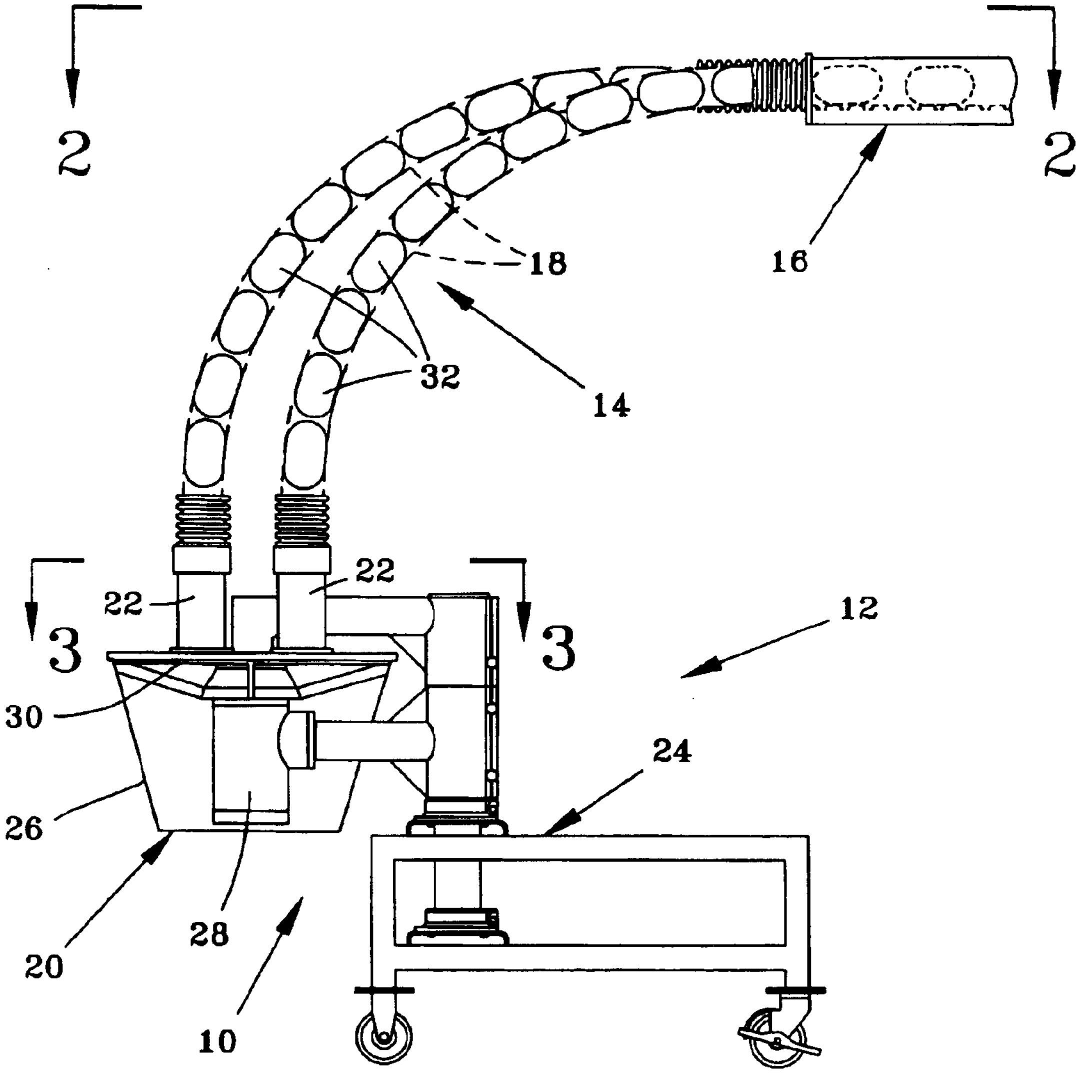
FIG. 1 is a side view of a product delivery and slicing system in accordance with a preferred embodiment of this invention.
Figure 2:
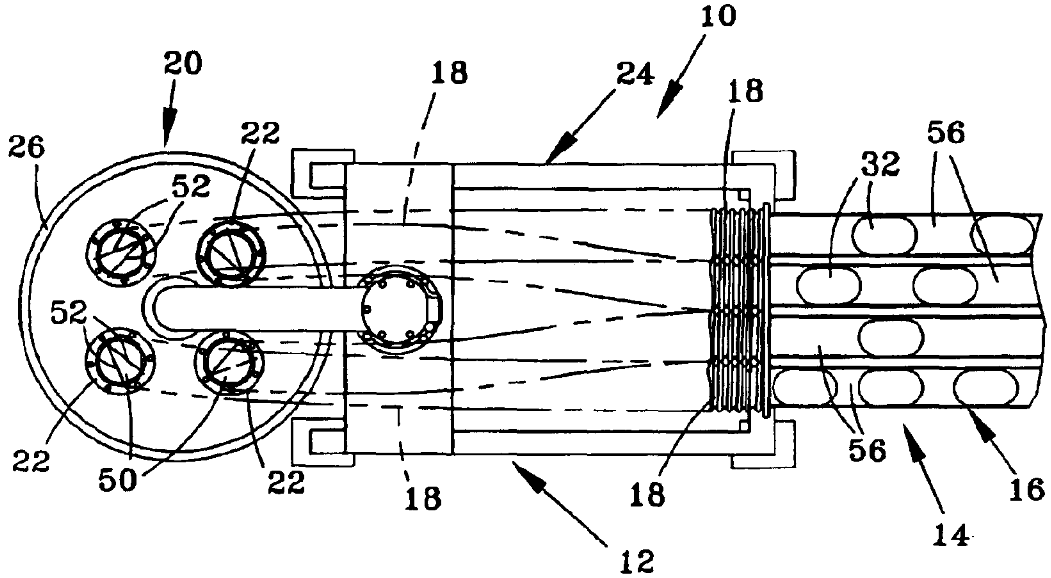
FIG. 2 is a plan view of the delivery and slicing system of FIG. 1.

FIGS. 1 and 2 are side and plan views, respectively, of processing unit 10 for producing sliced food product in accordance with the present invention. The processing unit 10 includes a system 14 for delivering food product 32 to an apparatus 12 with which the slicing operation is performed. The apparatus 12 generally comprises a slicing unit 20 and a frame 24 by which the slicing unit 20 is mounted and supported above the surrounding floor. The slicing unit 20, shown with its interior visible in FIG. 1, includes an enclosure 26, an internally-mounted electric motor 28, and a horizontal cutting wheel 30 housed within the enclosure 26 and driven by the motor 28. The enclosure 26 defines a chute from whose lower end the sliced food product exits the slicing unit 20. The frame 24 preferably houses the electrical wiring for powering the motor 28 and controls for operating the processing unit 10.

The product delivery system 14 includes a conveyor 16 and flexible tubes 18 that deliver the product 32 to a number of feed tubes 22 mounted to the top of the slicing unit 20. The feed tubes 22 feed the product 32 to the cutting wheel 30 within the slicing unit 20. In FIG. 2, portions of the flexible tubes 18 are omitted for clarity, providing a plan view of the feed tubes 22. Each of the feed tubes 22 is represented in the Figures as having a circular cross-sectional shape, though other shapes are possible, including tubes with square-shaped cross-sections. Each feed tube 22 provides a complete enclosure surrounding the product 32 as it is presented to the cutting wheel 30 through an opening 54 (FIGS. 5 and 6) defined at the lower end of each tube 22. However, as will become apparent from the following discussion, the feed tubes 22 are not required to completely surround the product 32. While four feed tubes 22 are shown in FIG. 2, it is foreseeable that any number of tubes 22 could be used, limited only by the surface area of the cutting wheel 30 relative to the size of the feed tubes 22.

Figure 3:
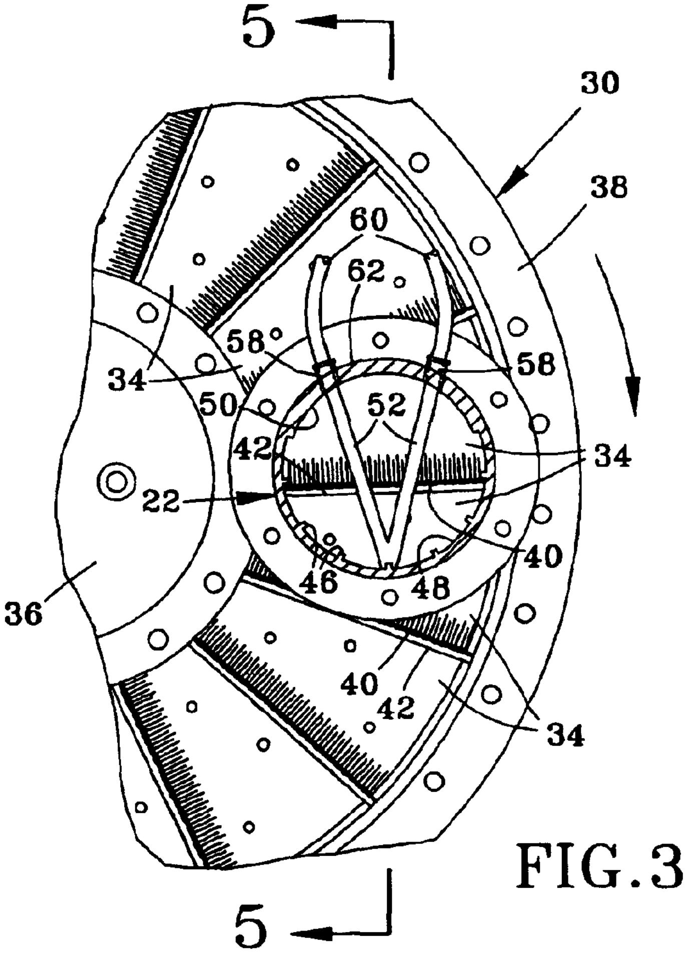
FIG. 3 is a plan view of a delivery tube and cutting wheel of the delivery and slicing system of FIG. 1.
Figure 4:
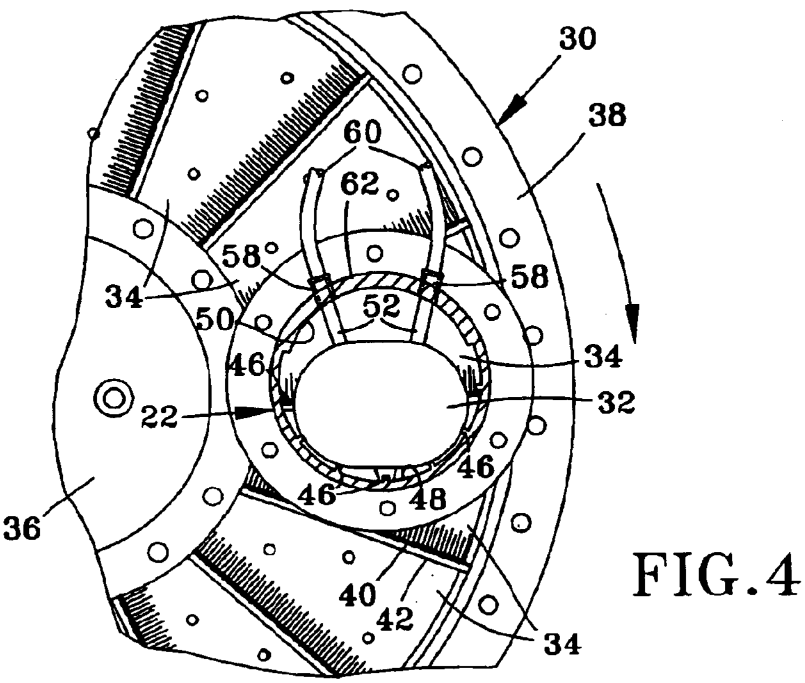
FIG. 4 is a plan view of the delivery tube of FIG. 3, and shows a food product traveling through the tube toward the cutting wheel beneath the tube.
Figure 5:
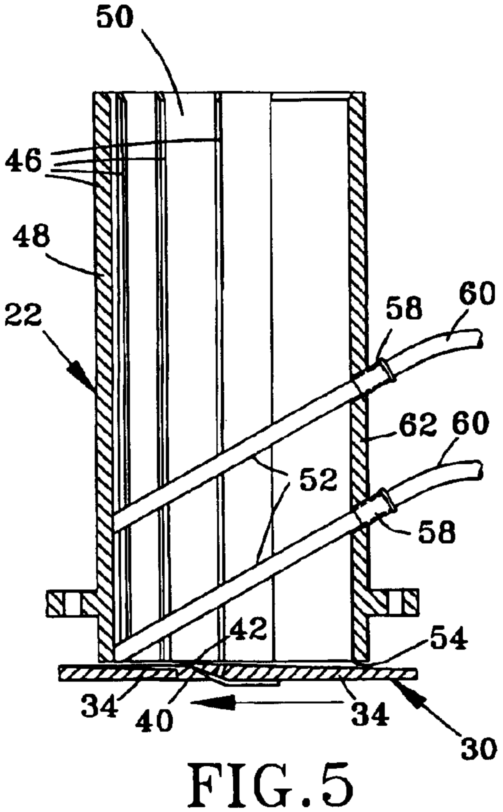
FIG. 5 is a cross-sectional view of the delivery tube and a blade of the cutting wheel of FIG. 3.
Figure 6:
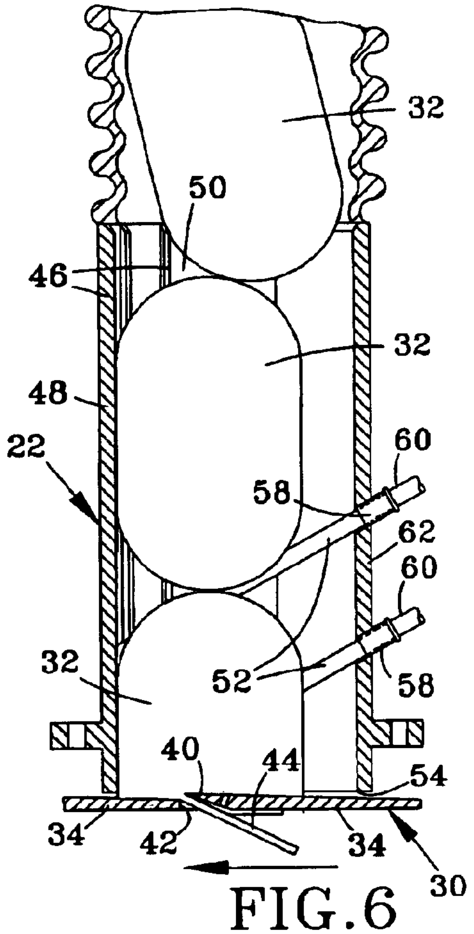
FIG. 6 is a cross-sectional view corresponding to FIG. 5, and shows food product traveling downward through the tube into engagement with a blade of the cutting wheel.

The cutting wheel 30 can be of various designs, a preferred design being the Microslice® cutting wheel disclosed in U.S. Pat. Nos. 5,992,284 and 6,148,709. As depicted in FIGS. 3 and 4, the cutting wheel 30 can be seen to generally comprise a number of radial blades 34 mounted between a hub 36 and an annular-shaped rim 38. In FIGS. 5 and 6, the blades 34 are seen as being closely spaced in the circumferential direction, with the cutting (leading) edge 40 of each blade 34 projecting above the trailing edge 42 of the preceding blade 34, thereby establishing the thickness of product slices 44 (FIG. 6) produced by the cutting wheel 30. It is worth noting that the blades 34 shown in FIGS. 3 through 6 are depicted as having corrugated cutting edges 40 that produce crinkle slices, i.e., a corrugated or sinusoidal shape with rounded peaks and valleys when viewed edgewise. Alternatively, the blades 34 could have flat cutting edges to produce flat slices, or V-shaped cutting edges to produce “V-slices” with relative sharp peaks and valleys when viewed edgewise. If the blades 34 are equipped with corrugated or V-shaped cutting edges 40, the radial placement of each blade 34 relative to the preceding blade 40 will determine the appearance of the slices. If the peaks and valleys of the blades 34 are aligned, each peak on one surface of a slice will correspond to a valley on the opposite surface of the slice, such that the thickness of the slice is substantially uniform. However, if the peaks and valleys of the adjacent blades 34 are not aligned, the slices produced will be characterized by alternating thick and thin-walled sections (known as “phase shift”), and if sufficiently misaligned the product 32 may be shredded by the cutting wheel 30. Whether slices or shredded product are desired will depend on the intended use of the product. As will become apparent from the following discussion, the present invention enables the type of product desired to be accurately and reliably determined by the cutting wheel 30, instead of randomly determined by changes in the orientation of the product during the cutting operation.

From FIGS. 1 and 2, it can be seen that the delivery system 14 singulates and orients the product 32 before delivering the product 32 in a substantially vertical direction to the feed tubes 22, which are also shown as being vertically oriented. The generally vertical presentation of the product 32 is due to the substantially horizontal orientation of the cutting wheel 30. While the feed tubes 22 are shown as being oriented at about 90 degrees to the surface (plane) of the cutting wheel 30, it is foreseeable that other orientations could be used, depending on the angle at which cuts are desired through the product 32. However, the cutting wheel 30 is preferably disposed in the horizontal plane, and the feed tubes 22 are disposed at an angle of about 15 to about 90 degrees, preferably about 90 degrees, to the cutting wheel 30.

While horizontal cutting wheels with vertical product delivery are known in the prior art, product orientation typically is of importance only if the product 32 is elongate, as represented in the Figures. Product orientation becomes of particular concern if the slicing operation is to produce very thin slices, e.g., on the order of about three mm or less, and a consistent peripheral shape is desired for the slices, such as a true cross-section of the product 32 or a consistent diagonal (bias) slice through the product 32. Finally, product stability becomes critical if crinkled or V-slices are desired, because any rotation of the product 32 about its longitudinal axis or lateral movement of the product 32 (i.e., perpendicular to the product's longitudinal axis) will result in misalignment of the peaks and valleys in the opposite surfaces of the slices, resulting in a product having a crosshatched (lattice) appearance that may include patterns of holes if the slices are sufficiently thin. The slicing of elongate potatoes to produce round crinkle or V-slice chips is a primary example of these circumstances, and therefore will be referred to throughout this description. However, round potatoes and other food products with various shapes, round, elongate and even rectilinear, can be handled with the processing unit 10 of this invention.

According to the invention, product stability during the cutting operation is achieved within the feed tubes 22 as a result of splines 46 or other suitable surface features present on the interior surface of a wall 48 of each feed tube 22, so as to project into a feed passage 50 defined by the tube 22. As shown, the splines 46 are oriented longitudinally to the axis of the tube 22, such that the splines 46 promote and maintain the orientation of the product 32 relative to the longitudinal axis of the tube 22. As seen in FIG. 4, product 32 with diameters smaller than the feed passage 50 could become misaligned within the passage 50 unless the product 32 is forced to remain in contact with the splines 46 throughout its travel through the passage 50. For this purpose, the feed tubes 22 are shown as being equipped with fluid jets 52 emitted from nozzles 58 located in a wall 62 of the tube 22 opposite the splines 46. Water is the preferred fluid for the jets 52, though it is foreseeable that other fluids, including liquids and gases, could be used. Water is represented in FIGS. 3 through 6 as being delivered to each nozzle 58 through a hose 60, though a manifold or other fluid handling technique could be used to deliver the fluid to the nozzles 58.

According to a preferred aspect of the invention, the fluid jets 52 combine to apply a lateral force to the product 32 that is sufficient to push the product 32 into contact with the splines 46 and thereafter cause the product 32 to remain in contact with the splines 46 while being sliced with the cutting wheel 30, as depicted in FIG. 6. As a result, the product 32 is inhibited from rotating about its longitudinal axis. According to another preferred aspect of the invention, multiple fluid jets 52 are employed to inhibit lateral movement of the product 32. For this purpose, two sets of two converging jets 52 are preferred, as shown in FIGS. 3 through 6, though any number of jets could be used, and not necessarily in pairs. The pair of fluid jets 52 in a given set are preferably coplanar and flow in a downward direction, as seen from the side views of FIGS. 5 and 6. One set of jets 52 is located directly above the other set, as can be discerned from the plan views of FIGS. 3 and 4. The jets 52 are preferably oriented at an acute angle to horizontal (and therefore to the cutting wheel 30) of up to about forty-five degrees, though it is foreseeable that the jets 52 could be oriented at other angles to horizontal, or horizontal and therefore parallel to the cutting wheel 30. Orienting the jets 52 to project at an angle toward the cutting wheel 30 is preferred to assist in stabilizing the product 32 while undergoing cutting by the blades 34, as well as assisting in feeding the product 32 downward through the tubes 22. In practice, an angle of about 30 degrees from horizontal in a direction toward the cutting wheel 30 has produced excellent results.

In FIG. 3, the pairs of jets 52 are depicted as converging to intersect at the opposite wall 48 of the feed tube 22. However, it is foreseeable that the jets 52 of a given pair could intersect some distance away from the tube wall 48, or not intersect at all. Of primary interest is that the jets 52 converge to inhibit lateral movement of the product 32, and thus promote the stability of the product 32 while within the passage 30 and particularly while the product 32 is subject to the forces applied by the blades 34 during the cutting operation. For this purpose, the jets 52 are preferably oriented to have an included angle of more than zero to less than 180 degrees, with a suitable angle between the jets 52 being up to about ninety degrees. In practice, an angle of about 30 degrees between the jets 52 has worked well. In addition, the stability of the product 32 is believed to be promoted if the jets 52 intersect at a point on the wall 48 of the tube 22 directly above the point at which the trailing edges 42 of the blades 34 last pass beneath the opening 54 of the tube 22 above the cutting wheel 30, as apparent from FIG. 3.

The force required to be applied to the product 32 in order to maintain the product 32 in contact with the splines 46 will depend in part on the mass and density of the product 32 and the speed of the blades 34. In practice, elongate potatoes of a size typical size for use in producing potato chips can be firmly held by four water jets 52 arranged as shown in FIGS. 3 through 6, where each jet 52 is discharged at a pressure of about 20 to about 30 psi (about 1 to about 2 bar) from a nozzle 58 having an orifice diameter of about 6.3 mm. Under these conditions, the total water flow rate through each tube 22 is about 10 gallons per minute (about 40 liters/minute).

While the stabilizing force desired for cooperation with the splines 46 has been described as being generated by fluid jets 52, it is foreseeable that other means for applying a generally lateral force on product 32 could be used, such as springs, bladders, spring-loaded paddles or rollers, and brushes. Furthermore, because the product 32 is retained within the passage 50 by the splines 46 and not any wall portion (e.g., wall 48) of the feed tube 22 (for example, see FIG. 6), it is possible that the passage 50 could be defined simply by a number of splines 46 or other longitudinal members and a force-applying means opposite the splines 46. However, in a preferred embodiment, each passage 50 is defined by a feed tube 22, and the periphery of each passage 50 is entirely enclosed by the tube walls 48 and 62 so that the fluid used in the jets 52 is contained and flows downwardly through the cutting wheel 30 with the sliced product. While suitable internal diameters for the tubes 22 will depend on the size of the particular product 32, a suitable diameter for tubes 22 used to deliver potatoes is about 3.5 to about 4 inches (about 9 to about 10 cm). Splines 46 for a tube 22 of this diameter are preferably spaced about 25 to about 30 degrees apart, and are present around about one-half of the circumference of the tube 22. Suitable dimensions for the splines 46 are a width of about 0.093 inch (about 2.4 mm) and a height of about 0.090 inch (about 2.3 mm).

In view of the importance of maintaining proper alignment of the product 32 within the feed tubes 22, it can be appreciated that proper presentation of the product 32 to the tubes 22 is also important. As depicted in FIGS. 1 and 2, the conveyor 16 of the product delivery system 14 preferably singulates and orients the elongate product 32 so that the longitudinal axis of each product 32 is essentially parallel to the flexible tube 18 that it enters for delivery to one of the feed tubes 22. This aspect of the invention is shown as being achieved by a conveyor with multiple lanes 56, each dedicated to delivering product 32 to one of the flexible tubes 18. A particularly suitable conveyor 16 for this purpose is an electromagnetic vibratory conveyor commercially available under the name Impulse from Key Technology, Inc. However, other devices for singulating product, elongate, round or otherwise, could be used.

While the invention has been described in terms of a preferred embodiment, it is apparent that other forms could be adopted by one skilled in the art. For example, the physical configuration of the processing unit 10, including the apparatus 12, delivery system 14, and slicing unit 20, could differ from that shown, and the physical and functional specifications of the invention could differ from those discussed. Therefore, the scope of the invention is to be limited only by the following claims.

What is claimed:

1. An apparatus for delivering food product to a means for cutting in a substantially horizontal plane through the product, the apparatus comprising:

a passage extending downwardly toward the cutting means and defining an opening in proximity to the cutting means, the passage comprising oppositely-disposed first and second portions;

means for delivering to the passage elongate food products having diameters smaller than a distance between the first and second portions of the passage, the delivering means being operable to longitudinally align the products with the passage so that the products enter and travel downwardly through the passage with a longitudinal axis of each product substantially parallel to the passage;

guide means disposed along the first portion of the passage and oriented substantially parallel to the passage; and means for applying a force on each of the products as the product travels downward through the passage so that the product is forced away from the second portion of the passage, toward the first portion of the passage, and into contact with the guide means during engagement with the cutting means, wherein the applying means comprises at least two fluid jets flowing across the passage from the second portion thereof toward the first portion thereof so as to impact the product as the product travels downward through the passage, forcing the product away from the second portion of the passage and into contact with the guide means, and the at least two fluid jets are disposed at an angle relative to each other of greater than 0 degrees and less than 180 degrees.

2. An apparatus according to claim 1, wherein the passage is defined by a tubular member, the first portion of the passage is defined by a first wall portion of the tubular member, and the applying means are located at an oppositely-disposed second wall portion of the tubular member.

3. An apparatus according to claim 1, wherein the at least two fluid jets are coplanar and converge toward the first portion of the passage.

4. An apparatus according to claim 1, wherein the at least two fluid jets intersect at the first portion of the passage.

5. An apparatus according to claim 1, wherein each of the at least two fluid jets flows in a downward direction at an angle of about 0 degrees to less than 90 degrees from horizontal.

6. An apparatus according to claim 1, wherein the passage is disposed at an angle of about 90 degrees to the plane of the cutting means.

7. An apparatus according to claim 1, wherein the cutting means comprises a hub at a vertical axis of rotation of the cutting means, and blades extending radially from the hub.

8. An apparatus according to claim 1, wherein the blades having cutting edges that produce a crinkled or V-slice cut through the product.

9. An apparatus according to claim 1, wherein the delivering means and the passage cooperate to cause the products to be stacked within the passage while one of the products located nearest the opening of the passage is engaged with the cutting means.

10. An apparatus for delivering elongate food product to a cutting means having a substantially horizontal cutting plane, the apparatus comprising:

means for defining a substantially vertical passage, the defining means comprising a wall portion, a second portion diametrically opposite the wall portion so as to be spaced apart from the wall portion by the passage, and an opening in proximity to the cutting means;

splines disposed on the wall portion and oriented substantially parallel to the passage;

at least a first set of at least two fluid jets flowing in a downward direction across the passage from the second portion of the passage toward the wall portion, the fluid jets converging toward the wall portion to apply a force on a product traveling downward through the passage, the at least two fluid jets forcing the product away from the second portion of the defining means and toward the wall portion of the defining means so as to maintain the product in contact with the splines during engagement with the cutting means; and means for delivering the product to the passage, the delivering means being operable to separate and longitudinally align the product with the passage so that the product enters and travels through the passage with a longitudinal axis of the product substantially parallel to the passage.

11. An apparatus according to claim 10, wherein the defining means is a tubular member, the wall portion of the defining means is a first wall portion of the tubular member, the second portion of the defining means is a second wall portion of the tubular member diametrically opposite the first wall portion, and the fluid jets are emitted from nozzles located in the second wall portion.

12. An apparatus according to claim 10, further comprising at least a second set of at least two fluid jets flowing in a downward direction across the passage from the second portion of the passage toward the wall portion, the second set of fluid jets converging toward the wall portion to apply a force on the product traveling downward through the passage, the second set of fluid jets being located above the first set of fluid jets within the passage.

13. An apparatus according to claim 12, wherein the first set of fluid jets are substantially coplanar and disposed at an angle relative to each other of up to about 90 degrees, the second set of fluid jets are substantially coplanar and disposed at an angle relative to each other of up to about 90 degrees, and each of the fluid jets flows in a downward direction at an angle of up to about 45 degrees from horizontal.

14. An apparatus according to claim 12, wherein the fluid jets of at least one of the first and second sets intersect at the wall portion of the passage.

15. An apparatus according to claim 10, wherein the passage is disposed at an angle of about 90 degrees to the cutting means.

16. An apparatus according to claim 10, wherein the cutting means comprises a hub at a vertical axis of rotation of the cutting means, and blades extending radially from the hub.

17. An apparatus according to claim 16, wherein each blade of the cutting means passes beneath the opening in a direction away from the second portion of the passage and toward the wall portion of the passage, the wall portion has an exit point at which each of the blades leaves the opening, and the fluid jets intersect directly above the exit point of the wall portion.

18. An apparatus according to claim 16, wherein the blades produce a crinkle or V-slice cut through the product.

19. A method of delivering food product to a means for cutting in a substantially horizontal plane through the product, the method comprising the steps of:

providing a passage extending downwardly toward the cutting means and defining an opening in proximity to the cutting means, the passage comprising guide means disposed along a first portion of the passage that is opposite a second portion of the passage, the guide means being oriented substantially parallel to the passage;

delivering to the passage elongate food products that have diameters smaller than a distance between the first and second portions of the passage, the products being delivered longitudinally aligned with the passage so that the products enter and travel downward through the passage with a longitudinal axis of each product substantially parallel to the passage; and applying a force to each of the products as the product travels downward through the passage so that the product is forced away from the second portion of the passage, toward the first portion of the passage, and into contact with the guide means during engagement with the cutting means, wherein the force is applied by at least two fluid jets flowing across the passage from the second portion thereof toward the first portion thereof so as to impact the product as the product travels downward through the passage, forcing the product away from the second portion of the passage and into contact with the guide means, and the at least two fluid jets are disposed at an angle relative to each other of greater than 0 degrees and less than 180 degrees.

20. A method according to claim 19, wherein the passage is defined by a tubular member, the first portion of the passage is defined by a first wall portion of the tubular member, and the force is applied from an oppositely-disposed second wall portion of the tubular member.

21. A method according to claim 19, wherein the at least two fluid jets are coplanar and converge toward the first portion of the passage.

22. An apparatus according to claim 19, wherein the at least two fluid jets intersect at the first portion of the passage.

23. An apparatus according to claim 19, wherein each of the at least two fluid jets flows in a downward direction at an angle of about 0 degrees to less than 90 degrees from horizontal.

24. A method according to claim 19, wherein the passage is disposed at an angle of about 90 degrees to the cutting means so that the product travels in a direction substantially perpendicular to the cutting means.

25. A method according to claim 19, wherein the cutting means rotates about a vertical axis and comprises a hub at the vertical axis and blades extending radially from the hub.

26. A method according to claim 25, wherein the blades produce a crinkle or V-slice cut through the product.

27. A method according to claim 19, wherein the products are delivered to the passage so that the products are stacked within the passage while one of the products located nearest the opening of the passage is engaged with the cutting means.

28. A method of delivering elongate food product to a cutting means having a substantially horizontal cutting plane, the method comprising the steps of:

providing a substantially vertical passage defined by a wall portion, a second portion diametrically opposite the wall portion so as to be spaced apart from the wall portion by the passage, and an opening in proximity to the cutting means, the wall portion having splines extending therefrom and oriented substantially parallel to the passage;

delivering elongate product to the passage so that the elongate product are separated and longitudinally aligned with the passage so that the elongate product enters and travels through the passage with a longitudinal axis of the elongate product substantially parallel to the passage; and flowing at least a first set of at least two fluid jets in a downward direction across the passage from the second portion of the passage toward the wall portion, the fluid jets converging toward the wall portion to apply a force on a product traveling downward through the passage, the product within the passage being forced away from the second portion of the vertical passage and toward the wall portion of the vertical passage so as to maintain the product in contact with the splines during engagement with the cutting means.

29. A method according to claim 28, wherein the passage is defined by a tubular member, the wall portion is a first wall portion of the tubular member, the second portion is a second wall portion of the tubular member diametrically opposing the first wall portion, and the fluid jets are emitted from nozzles located at the second wall portion.

30. A method according to claim 28, wherein at least a second set of at least two fluid jets flow across the passage toward the wall portion so as to impact the product as the product travels downward through the passage, the second set of fluid jets being located above the first set of fluid jets within the passage.

31. A method according to claim 30, wherein the first set of fluid jets are substantially coplanar and disposed at an angle relative to each other of up to about 90 degrees, the second set of fluid jets are substantially coplanar and disposed at an angle relative to each other of up to about 90 degrees, and each of the fluid jets flows in a downward direction at an angle of up to about 45 degrees from horizontal.

32. A method according to claim 30, wherein the fluid jets of at least one of the first and second sets intersect at the wall portion of the passage.

33. A method according to claim 28, wherein the passage is disposed at an angle of about 90 degrees to the cutting means so that the product travels in a direction substantially perpendicular to the cutting means.

34. A method according to claim 28, wherein the cutting means rotates about a vertical axis and comprises a hub at the vertical axis and blades extending radially from the hub.

35. A method according to claim 34, wherein each blade of the cutting means passes beneath the opening in a direction away from the second portion of the passage and toward the wall portion of the passage, the wall portion has an exit point at which each of the blades leaves the opening, and the fluid jets intersect directly above the exit point of the wall portion.

36. A method according to claim 34, wherein the blades produce a crinkle or V-slice cut through the product.

* * * * *

UNITED STATES PATENT AND TRADEMARK OFFICE
CERTIFICATE OF CORRECTION

PATENT NO. : 6,973,862 B2
DATED : December 13, 2005
INVENTOR(S) : Brent L. Bucks and Daniel W. King It is certified that error appears in the above-identified patent and that said Letters Patent is hereby corrected as shown below:

Title page,
Item [75], Inventors, add -- Daniel W. King, Valparaiso, IN --.

Signed and Sealed this

Twenty-first Day of March, 2006

JON W. DUDAS
*Director of the United States Patent and Trademark Office*